March 6, 1962            A. L. BAKER            3,023,503
ADJUSTING DEVICE
Filed Dec. 27, 1956
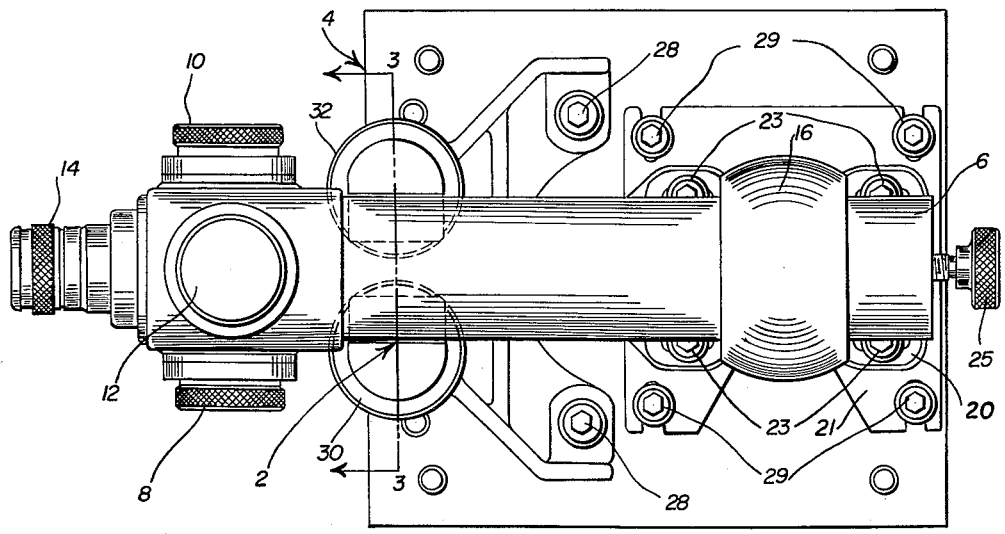
Fig. I
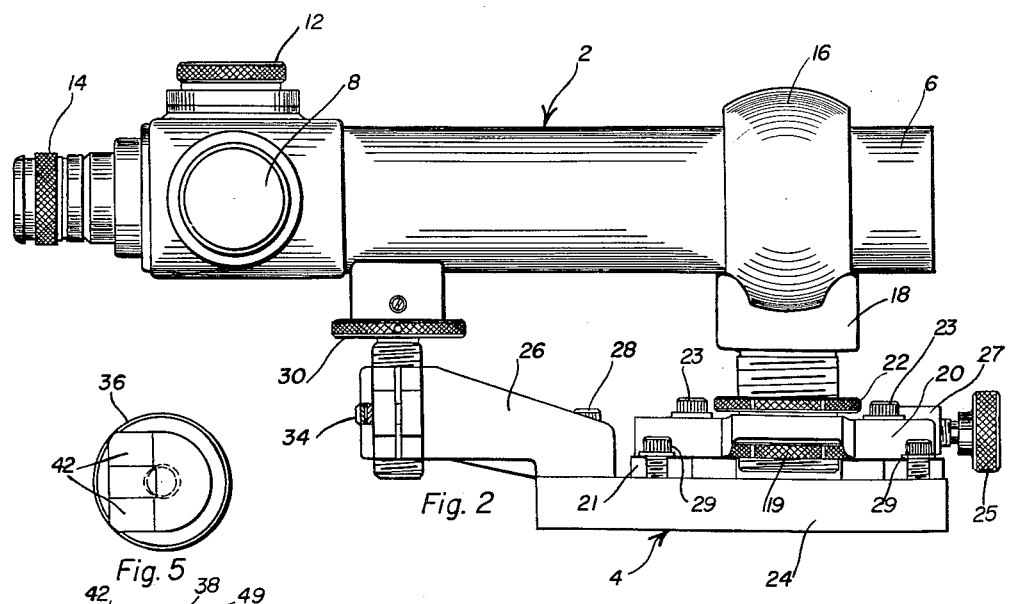
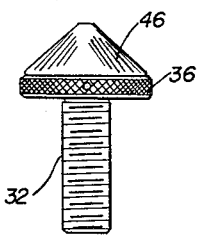
INVENTOR.
BY ALLISTER L. BAKER
ATTORNEY

3,023,503
ADJUSTING DEVICE

Allister L. Baker, Denville, N.J., assignor to Keuffel & Esser Company, Hoboken, N.J., a corporation of New Jersey
Filed Dec. 27, 1956, Ser. No. 630,909
5 Claims. (Cl. 33—46)

This invention relates to an adjustable V support. The support is generally of the type known as a V block which is used for supporting cylindrical objects so that their axis is horizontal. In the present case, the V support is made of two members which are independently adjustable to enable the portion of the cylindrical object over the V support to be adjusted transversely to the cylindrical axis both horizontally and vertically. More particularly, the invention is useful for adjusting a telescope in a cylindrical tube provided with a sphere mounted thereon by tilting it about horizontal and vertical axes passing through the center of the sphere perpendicular to the axis of the tube when the adjustable V support is incorporated in an adjustment device including a suitable support for the sphere.

These objects of the invention and the means for their attainment will be more fully understood after reading the following description taken in conjunction with the accompanying drawing in which:

FIG. 1 is a view in plan showing the new adjustable V support incorporated in a supporting stand for a telescope.

FIG. 2 is a view in elevation of the apparatus shown in FIG. 1.

FIG. 3 is a view in sectional elevation of one of the adjustable elements taken through the center line thereof along the line 3—3 in FIG. 1 and looking in the direction of the arrows.

FIG. 4 is a view in side elevation of another embodiment of the adjustable element shown in FIG. 3.

FIG. 5 is a view in plan of the adjustable element shown in FIG. 3.

In the drawings, a telescope is shown mounted on the adjustable support stand 4. The telescope shown is an alignment telescope of the type normally used in optical tooling. It will be realized, however, that the adjustable V support to be described hereinafter will also be useful for adjusting other types of telescopes, collimators or other cylindrical objects. The telescope 2 includes a telescope tube 6 having an outer cylindrical surface, a focusing knob 8 and horizontal and vertical micrometer knobs 10 and 12. An eyepiece 14 is provided on one end of the tube 6 beyond the knobs mentioned above. An adapter 16 with a spherical outer surface centered on the axis of the cylindrical outer surface of the telescope tube 6 is mounted over the telescope tube 6 as shown.

The adjustable support stand 4 is provided with a support 18 which is known in the art as a cup mount and which serves to support the spherical adapter 16. The cup mount 18 is provided with an inwardly inclined surface or surfaces which support the spherical surface on the adapter 16 but permit the spherical adapter to be turned about its center. The inner surface of the cup mount may be, for example, spherical, conical or three or more flat inclined surfaces may be used. The cup mount 18 is threaded into the plate 20 for adjusting the height of the spherical adapter 16 and thereby the height of the telescope 2. A lock nut 22 is provided to hold the cup mount 18 in adjusted position. A lock nut 19 may also be provided under the plate 20. The plate 20 is secured to the lower plate 21 by four screws 23 as shown. The holes for the screws 23 through the plate 20 are slotted in the direction of the axis of the telescope 2. A screw 25 acts between the block 27 secured to the plate 21 and the plate 20 for longitudinal adjustment of the plate 20 and thereby the cup mount 18. The four screws 29 secure the plate 21 to the base 24 of the support stand.

The frame 26 is also secured to the base 24 by screws 28. This frame 26 serves as the base for the adjustable V support which is formed by the two screw members 30 and 32 threaded therein. Each of these two screw members 30 and 32 carries an inclined surface which intersects the axis of the screw member. The cylindrical portion of the telescope 6 rests on these two inclined surfaces of the two screw members 30 and 32. The frame 26 is split from each threaded hole outward and a screw 34 is provided to adjust the fit of the threads in the hole to those on each of the screw members 30 and 32. By this means, it is possible to eliminate any play which might otherwise exist between the threads of the screw members 30 and 32 and the frame 26. Such play might exist initially or might develop as a result of the wear of the threads. The screws 34 may also be used for locking the screws 30 and 32 in an adjusted position.

FIGS. 3 and 4 and 5 show two specific embodiments for the screw members 30 and 32. The embodiment shown in FIGS. 3 and 5 is the same as the embodiment shown in FIGS. 1 and 2. Referring to this embodiment, the lower portion of the screw is threaded with a thread of uniform diameter. A knurled portion 36 of increased diameter is provided above the threaded portion. Above the knurled portion the diameter is again reduced to form a shaft 38. A supporting shoe 40 provided with an inclined flat surface 42 is mounted on the shaft 38 so that the screw 32 may be turned within the shoe 40 in order to raise or lower the surface 42 without turning the same about the axis of the screw. As shown, the bore in the shoe 40 is of slightly greater diameter than the outside diameter of the shaft 38 provided on the screw. This difference in diameter is taken up by the weight of the object resting on the inclined surfaces 42, the bore in the shoe 40 being enlarged on the side of the surface 42 as shown in FIG. 5 so that in effect it contacts the shaft 38 along two vertical lines. A set screw 44 is provided in the shoe 40 which engages an annular slot in the shaft 38 in order to hold the shoe 40 on to the screw 32.

In the embodiment of FIG. 4, the screw 32 is made entirely of one piece of metal. As in FIG. 3, the lower portion is provided with a thread of uniform diameter. A knurled portion 36 of increased diameter is provided above the threaded portion. A conical surface 46 is provided above the knurled portion of increased diameter. This conical surface 46 intersects the axis of the screw 32; i.e., the apex of the conical surface lies on the axis of the screw 32. By turning the screw 32 the conical surface 45 may be raised or lowered. However, as this surface is raised or lowered one element of the conical surface will always contact the cylindrical portion of the telescope tube 6 in the same manner as the telescope tube 6 would be supported by the flat surface 42 if the embodiment of FIG. 3 were used.

Referring again to FIGS. 1 and 2 and supposing for example, it is desired to adjust the telescope tube by raising that portion of the telescope tube 6 which lies above the screw members 30 and 32 in order to tilt the telescope tube about a horizontal axis passing through the center of the spherical adapter 16 perpendicular to the plane of the drawing. This would be accomplished by turning both screws 30 and 32 equally in the same direction which would raise both of the surfaces 42 that contact the cylindrical surface of the tube 6 thereby raising the tube. In this type of adjustment, the intersection of the two surfaces 42 on the screws 30 and 32 would move upward in a vertical plane. On the other hand, if screws made according to the embodiment of FIG. 4 were used, the intersection of the elements of the conical surface 46 which contact the cylindrical surface 6 would move upward in a vertical plane.

If, for example, it was desired to adjust the telescope tube by moving that portion of the telescope tube 6 which lies above the screw members 30 and 32 horizontally in order to tilt the telescope about a vertical axis passing through the center of the spherical adapter 16, the screws 30 and 32 would be turned equally in opposite directions. This would raise one of the planes 42 and lower the other plane 42 but the intersections of both planes 42 on the two screws 30 and 32 would remain in the same horizontal plane so that the adjustment would have no component in the vertical direction. In the embodiment of FIG. 4, the intersection of the elements of the conical surfaces 46 of the two screws 30 and 32 which contact the cylindrical surface 6 of the telescope tube would move in a horizontal plane.

While the adjustable V support made up of the two screws 30 and 32 has been described specifically for use with a telescope provided with a spherical adapter 16 held in a cup mount 18, the invention is not necessarily so limited. For example, two pairs of V supports may be used to support a cylindrical tube and one pair may be used to make the rotational adjustments described above with respect to the other pair. On the other hand by adjusting both pairs in such an arrangement it is possible to achieve a purely translational adjustment of the axis of the cylinder. The cone screws illustrated in FIG. 4 are particularly suitable for use in applications where two pairs of V supports are used.

In the drawings and in the above description, it has been assumed that the screws making up the adjustable V support are mounted so that their axes are vertical. It should be realized however, that the same result can be achieved by mounting the two screws with axes horizontal as long as an inclined surface intersecting the axis of each screw is provided. In such an embodiment, turning the screws to bring the inclined surfaces together would raise the cylindrical body. Moving the inclined surfaces apart would lower the cylindrical body. Moving both surfaces to the right, would move the body to the right and moving both surfaces to the left would move the body to the left.

Having thus described the invention, what is claimed is:

1. An adjusting device for supporting a telescope for angle of elevation and azimuth adjustments, comprising a base, a cup-shaped socket including a generally spherically shaped concave surface having a center axis, means to mount said cup-shaped socket on said base, first and second generally parallel adjusting screws mounted on cooperating first and second base portions of said base with said adjusting screws extending generally parallel to the said center axis of said cup-shaped socket, a first shoe mounted adjacent the outer end of the first adjusting screw, a second shoe mounted adjacent the outer end of the second adjusting screw, one of said first base portion and said first shoe having a threaded bore receiving said first adjusting screw providing means to move said first shoe along the axis of said first screw, one of said second base portion and said second shoe having a threaded bore receiving said second adjusting screw providing means to move said second shoe along the axis of said second screw, each of said shoes having a substantially plane surface inclined to the axis of its adjusting screw with such surface having a substantial dimension in each direction in a plane disposed at an acute angle to the axis of its adjusting screw whereby the telescope supporting surface of the shoe will snugly engage a cylindrical surface of a telescope to assure accurate support thereof over a substantial area, whereby a telescope having a spherical surface for reception in said cup-shaped recess and having a cylindrical surface for engaging the inclined surfaces of the shoes can be accurately adjusted in angle of elevation and azimuth with respect to a line of reference.

2. The invention according to claim 1, in which means are provided for adjusting the generally spherically shaped concave cup-shaped socket in the same general direction as the center axis of said socket and the axes of said adjusting screws.

3. The invention according to claim 1, in which means are provided for moving the cup-shaped socket transversely of the center axis thereof.

4. An adjusting device for supporting a telescope for angle of elevation and azimuth adjustments, comprising a base, a cup-shaped socket including a concave surface of generally spherical shape, means to mount said cup-shaped socket on said base with its mouth extending away from said base, a pair of generally parallel adjusting screws threadedly mounted in threaded bores in said base with said adjusting screws extending in the direction of the opening of the cup-shaped socket, a shoe rotatively mounted on the upper end of each of said adjusting screws, said shoe having a substantially plane surface inclined to the axis of its supporting screw with such surface having a substantial dimension in each direction in a plane disposed at an acute angle to the axis of its supporting screw whereby the telescope supporting surface of the shoe will snugly engage a cylindrical surface of a telescope to assure accurate support thereof over a substantial area, whereby a telescope having a spherical surface for reception in said cup-shaped recess and having a cylindrical surface for engaging the inclined surfaces of the shoes can be accurately adjusted in angle of elevation and azimuth with respect to a line of reference.

5. The invention according to claim 4, in which means are provided for vertically adjusting the spherical cup-shaped receiving member in the same general direction as the axes of said adjusting screws.

References Cited in the file of this patent
UNITED STATES PATENTS

| | | |
|---|---|---|
| 1,274,554 | Ives | Aug. 6, 1918 |
| 2,224,783 | Gibbs | Dec. 10, 1940 |
| 2,424,011 | Gramont | July 15, 1947 |
| 2,576,007 | Fischer et al. | Nov. 20, 1951 |
| 2,787,234 | Mach | Apr. 2, 1957 |